(12) United States Patent
Umezu

(10) Patent No.: US 7,342,333 B2
(45) Date of Patent: Mar. 11, 2008

(54) OUTER ROTOR TYPE MULTIPOLAR GENERATOR

(75) Inventor: Jun Umezu, Gunma (JP)

(73) Assignee: Sawafuji Electric Co., Ltd., Tokyo (JP)

( * ) Notice: Subject to any disclaimer, the term of this patent is extended or adjusted under 35 U.S.C. 154(b) by 141 days.

(21) Appl. No.: 10/528,115

(22) PCT Filed: Sep. 24, 2003

(86) PCT No.: PCT/JP03/12162

§ 371 (c)(1),
(2), (4) Date: Oct. 7, 2005

(87) PCT Pub. No.: WO2004/030181

PCT Pub. Date: Apr. 8, 2004

(65) Prior Publication Data

US 2006/0250034 A1    Nov. 9, 2006

(30) Foreign Application Priority Data

Sep. 25, 2002   (JP) .............................. 2002-278480

(51) Int. Cl.
*H02K 9/06* (2006.01)
(52) U.S. Cl. .......................... 310/67 R; 310/58; 310/62
(58) Field of Classification Search .............. 310/67 R, 310/58, 62
See application file for complete search history.

(56) References Cited

U.S. PATENT DOCUMENTS

2002/0053838 A1*   5/2002   Okuda ........................ 310/59
2006/0250034 A1*  11/2006   Umezu ..................... 310/67 R

FOREIGN PATENT DOCUMENTS

| DE | 195 13 134 A1 | 10/1996 |
| FR | 2 536 222 A | 5/1984 |
| JP | 9-93849 | 4/1997 |
| JP | 2001-339925 | 12/2001 |

* cited by examiner

*Primary Examiner*—Darren Schuberg
*Assistant Examiner*—Hong-Vinh Nguyen
(74) *Attorney, Agent, or Firm*—Arent Fox LLP

(57) ABSTRACT

An outer rotor type multi-pole generator includes a stator mounted on a stationary support, and a rotor formed by fixedly attaching a magnet to the inner periphery of a bottomed cylindrical rotor yoke that is coaxially fixed to an end of a drive shaft rotatably supported by the support and that coaxially covers the stator. A plurality of radially extending vanes are integrally provided in a closed end of the rotor yoke, and a plurality of intake holes positioned between the vanes are formed in the closed end of the rotor yoke. It is thereby possible to reduce the number of components and improve the efficiency of assembly operations, and to set the overall axial length of the generator at a relatively small value while avoiding any reduction in the rigidity with which the rotor is supported.

3 Claims, 5 Drawing Sheets

US 7,342,333 B2

OUTER ROTOR TYPE MULTIPOLAR GENERATOR

CROSS-REFERENCE TO RELATED APPLICATION

This application is a National Stage entry of International Application Number PCT/JP03/12162, filed Sep. 24, 2003. The disclosure of the prior application is hereby incorporated herein in its entirety by reference.

FIELD OF THE INVENTION

The present invention relates to an improvement of an outer rotor type multi-pole generator that includes a stator mounted on a stationary support, and a rotor formed by fixedly attaching a magnet to the inner periphery of a bottomed cylindrical rotor yoke that is coaxially fixed to an end of a drive shaft rotatably supported by the support and that coaxially covers the stator, cooling air being made to flow within a stationary casing covering the stator and the rotor.

BACKGROUND ART

In such an outer rotor type multi-pole generator, as disclosed in, for example, Japanese Patent Application Laid-open No. 9-93849, cooling air is made to flow within a casing by mounting on a rotor yoke a cooling fan, which is a separate body from the rotor yoke.

DISCLOSURE OF INVENTION

However, in the above-mentioned conventional arrangement, in which a cooling fan is mounted on a rotor, not only is the number of components relatively large, but also the efficiency of assembly operations is reduced since the assembly takes a long time and is laborious. Furthermore, the cooling fan might cause a state in which the air within the casing is stirred, and the occurrence of such a state might degrade the efficiency. Moreover, mounting a cooling fan on a rotor inevitably makes the overall axial length of the generator relatively large. In particular, when a cooling fan is mounted on an open end side of the rotor, it is necessary to set the length of the drive shaft at a relatively large value, and since the rotor is cantilever-supported by a support, there is a possibility that the rigidity with which the rotor is supported might be degraded.

The present invention has been accomplished under the above-mentioned circumstances, and it is an object thereof to provide an outer rotor type multi-pole generator that enables the number of components to be reduced, the efficiency of assembly operations to be improved, the overall axial length of the generator to be reduced to a relatively small value while avoiding any deterioration in the rigidity with which the rotor is supported, and cooling to be carried out efficiently.

In order to attain this object, in accordance with a first aspect of the present invention, there is provided an outer rotor type multi-pole generator that includes a stator mounted on a stationary support, and a rotor formed by fixedly attaching a magnet to the inner periphery of a bottomed cylindrical rotor yoke that is coaxially fixed to an end of a drive shaft rotatably supported by the support and that coaxially covers the stator, cooling air being made to flow within a stationary casing covering the stator and the rotor, characterized in that a plurality of radially extending vanes are integrally provided in a closed end of the rotor yoke, and a plurality of intake holes positioned between the vanes are formed in the closed end of the rotor yoke. In accordance with the arrangement of the first aspect, since the plurality of vanes are provided integrally with the closed end of the rotor yoke with the intake holes disposed therebetween, compared with a conventional arrangement in which a cooling fan is installed, it is possible to reduce the number of components and improve the efficiency of assembly operations, it is unnecessary to ensure that there is a space, other than the rotor, exclusively used for generating cooling air, and it is unnecessary to set the length of the drive shaft at a relatively large value; it is therefore possible to avoid a reduction in the rigidity with which the rotor is supported, and it is possible to set the overall axial length of the generator at a small value. Moreover, the weight and balance of the rotor, which exhibits a flywheel function, can be optimized by means of the intake holes and, furthermore, cooling air flowing through the stator can be generated reliably by means of the vanes accompanying rotation of the rotor, thus avoiding a reduction in efficiency.

Furthermore, in accordance with a second aspect of the present invention, in addition to the first aspect, there is provided the outer rotor type multi-pole generator wherein the rotor yoke includes an end wall member and a cylindrical member, the end wall member being die-cast molded so as to integrally have a disk portion having a central part thereof fixed to the end of the drive shaft, a ring portion coaxially surrounding the disk portion, and the plurality of vanes providing a connection between the disk portion and the ring portion, and the cylindrical member being formed in a cylindrical shape coaxially covering the stator and having one end thereof fixed to the ring portion; in accordance with this arrangement, it is possible to form the plurality of vanes more precisely by die-cast molding of the end wall member.

BRIEF DESCRIPTION OF DRAWINGS

FIG. 1 is a vertical sectional view of an outer rotor type multi-pole generator, FIG. 2 is a perspective view of a rotor, FIG. 3 is a front view of the rotor, FIG. 4 is a sectional view along line 4-4 in FIG. 3, and FIG. 5 is a sectional view along line 5-5 in FIG. 4.

BEST MODE FOR CARRYING OUT THE INVENTION

Figure 1:
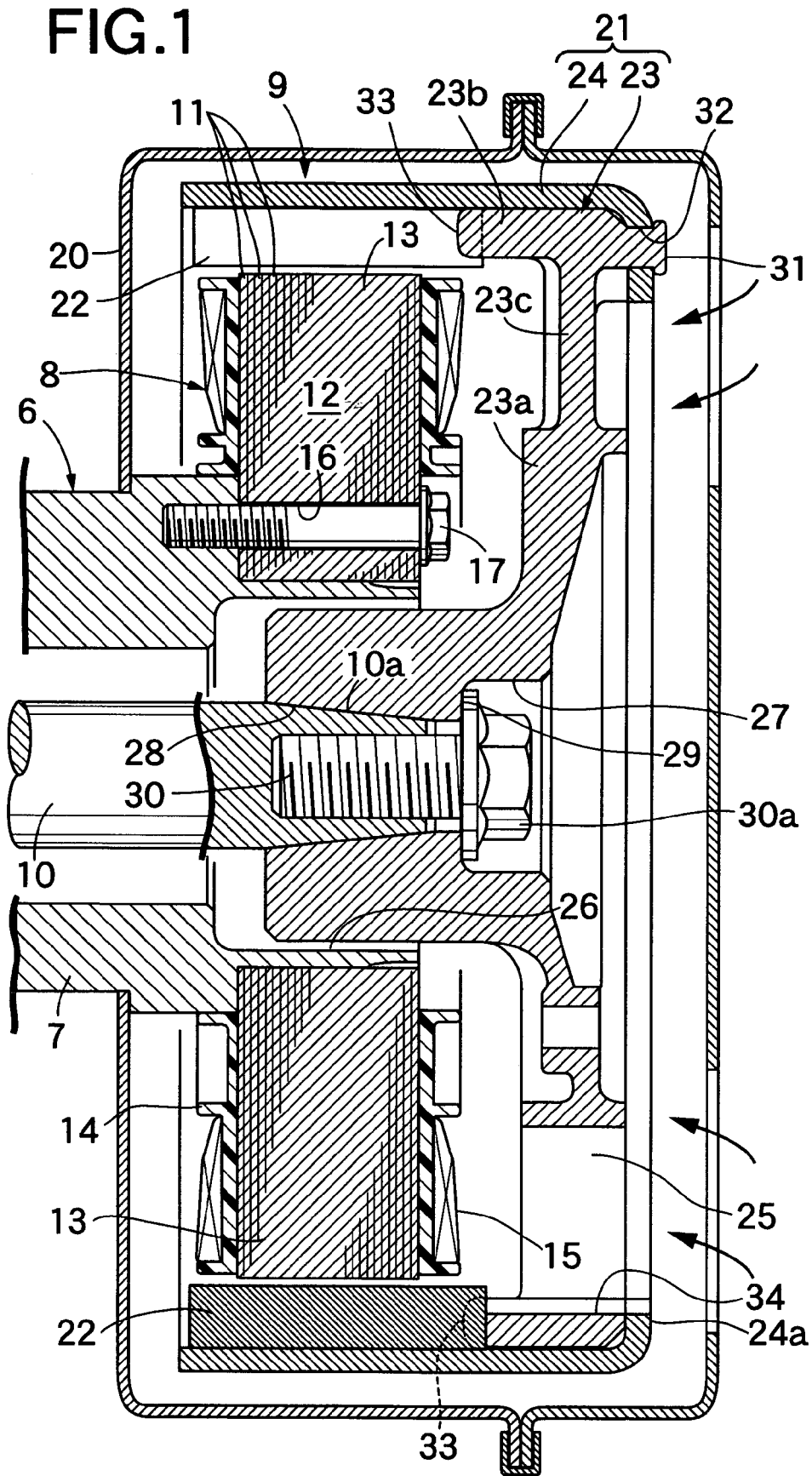
FIG. 1 to FIG. 5 illustrate one embodiment of the present invention.
Figure 2:
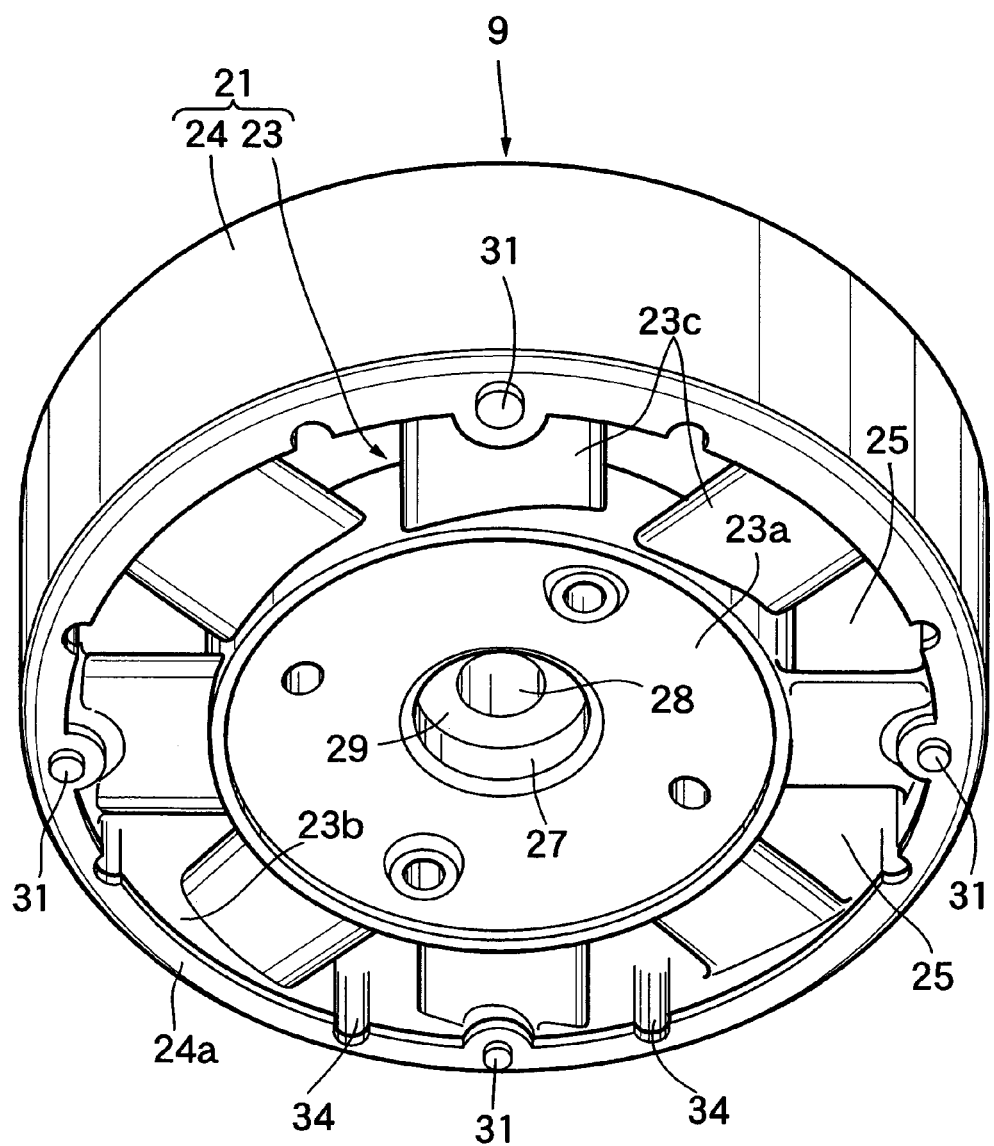
Figure 3:
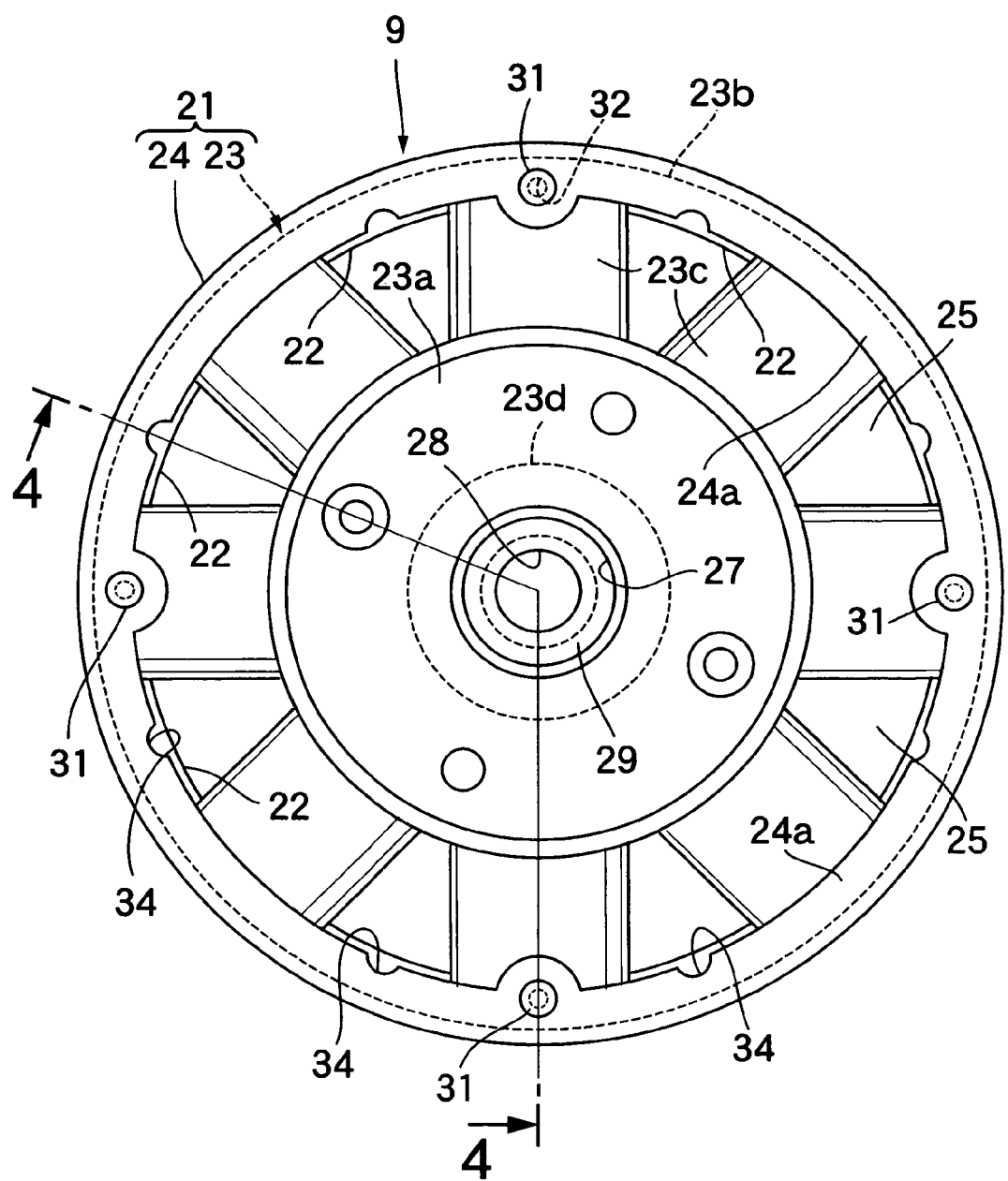
Figure 4:
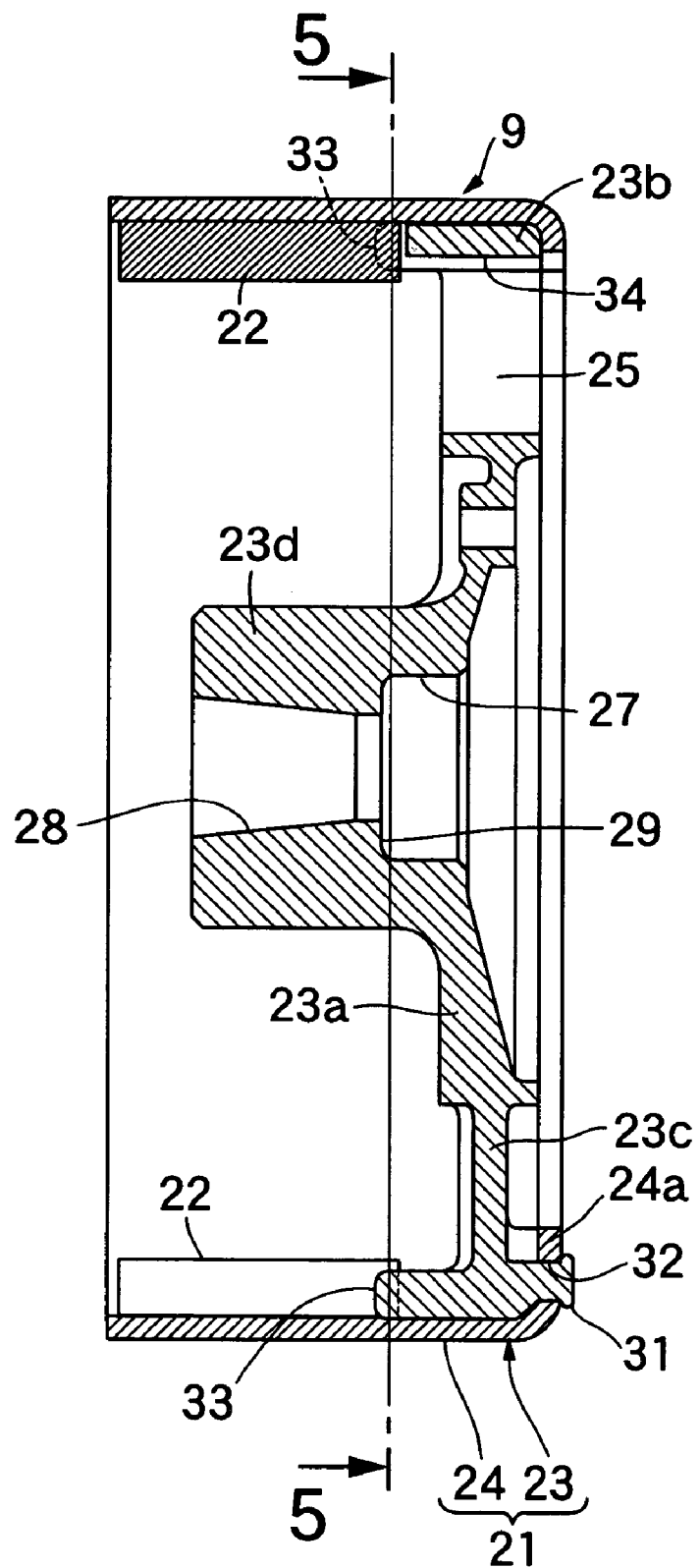
Figure 5:
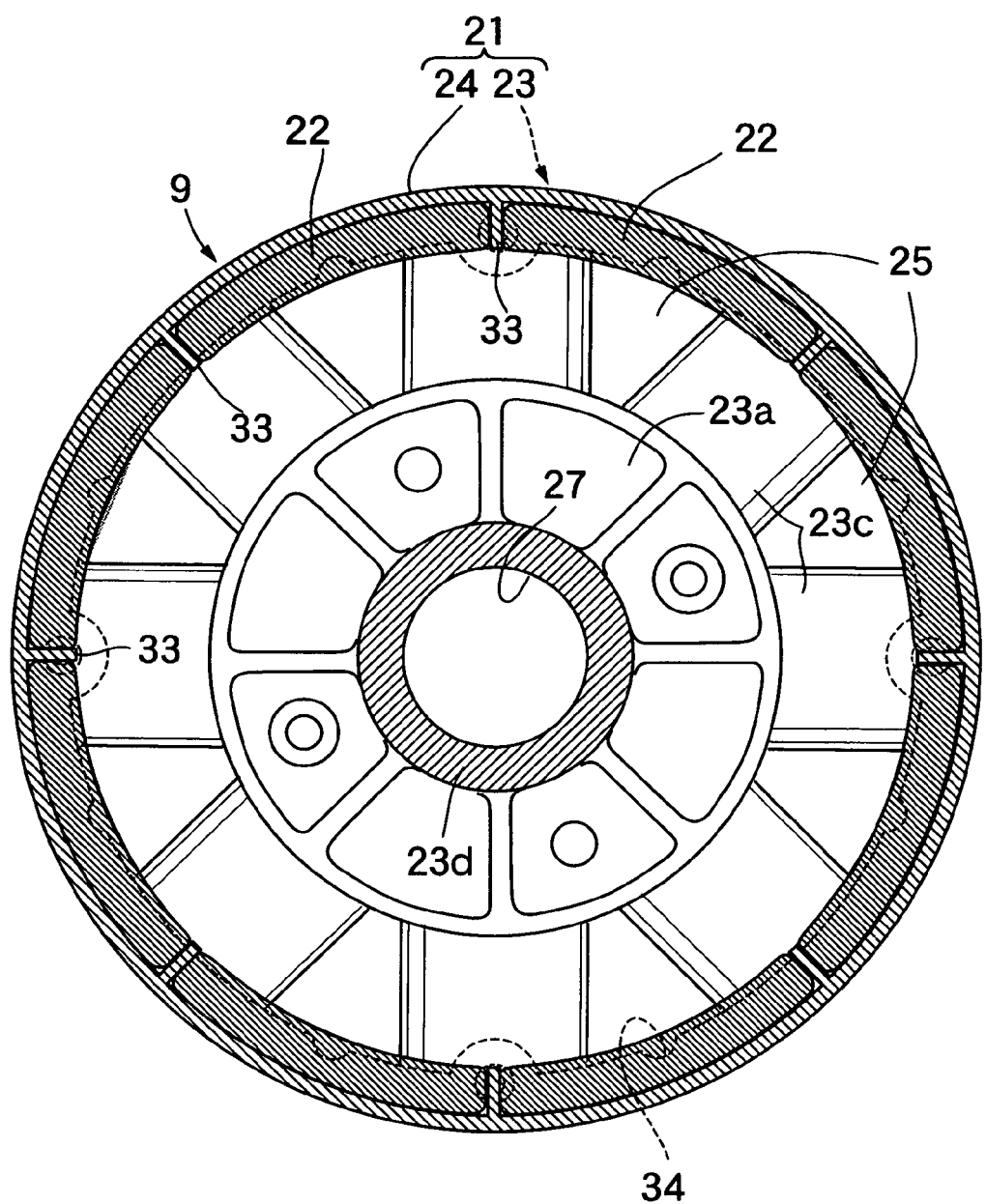

One embodiment of the present invention is explained below with reference to FIG. 1 to FIG. 5; firstly in FIG. 1, this outer rotor type multi-pole generator is used as, for example, an engine generator, and includes a stator 8 mounted on an engine main body 6 via a hollow support 7, and a rotor 9 covering the stator 8, the rotor 9 being fixed to an end of a crankshaft 10, which is a drive shaft, running rotatably through the support 7 and arranged coaxially with the stator 8.

The stator 8 includes a stator core 12 formed by laminating a plurality of ring-shaped core plates 11, and a plurality of projecting poles 13 are projectingly provided with equal intervals therebetween on the outer periphery of the stator core 12, the projecting poles 13 having a substantially T-shaped form within a plane perpendicular to the axis of the stator core 12.

A majority of the stator core 12 is covered with a synthetic resin bobbin 14, the bobbin 14 being injection molded to cover the stator core 12 so that the extremity of each of the projecting poles 13 and a part of opposite end faces and an inner peripheral face of the stator core 12 are exposed. Moreover, coils 15 are wound around the bobbin 14 at sections corresponding to the projecting poles 13.

Through holes 16 are provided in an inner peripheral part of the stator core 12 at a plurality of positions that are spaced in the peripheral direction of the stator core 12, and by screwing and tightening a bolt 17 inserted into each of the through holes 16 into the support 7 the stator core 12 is coaxially fixed to the support 7. Fixedly supported on the support 7 is a casing 20 covering the stator 8 and the rotor 9.

Referring to FIG. 2 to FIG. 5, the rotor 9 is formed by fixedly attaching a plurality of magnets 22 to the inner periphery of a bottomed cylindrical rotor yoke 21 coaxially covering the stator 8, and a central part of a closed end of the rotor yoke 21 is fixed coaxially to the end of the crankshaft 10.

The rotor yoke 21 is formed from an end wall member 23 die-cast molded from a light alloy of aluminum, etc., and a cylindrical member 24 made of, for example, mild steel in a cylindrical shape coaxially covering the stator 8, the cylindrical member 24 being fixed at one end thereof to an outer peripheral part of the end wall member 23 and the plurality of magnets 22 being fixedly attached to the inner periphery of the cylindrical member 24.

The end wall member 23 is integrally formed from a disk portion 23*a* having a central part thereof fixed to the end of the crankshaft 10, a ring portion 23*b* coaxially surrounding the disk portion 23*a*, and a plurality of vanes 23*c* providing a connection between the disk portion 23*a* and the ring portion 23*b*, the vanes 23*c* being formed so as to radially connect the disk portion 23*a* to the ring portion 23*b*. Intake holes 25 disposed between the vanes 23*c* are formed in the end wall member 23.

The disk portion 23*a* is provided integrally with a hub 23*d* having a part thereof housed in a recess 26 provided in an end of the support 7, and this hub 23*d* is provided with an operating hole 27 opening on the side opposite to the support 7, a tapered hole 28 increasing in diameter toward the support 7 side, and an annular stepped portion 29 formed between the two holes 27 and 28 so as to face the side opposite to the support 7. Said one end of the crankshaft 10 is coaxially provided with a tapered portion 10*a* that is fitted into the tapered hole 27, and by tightening within the operating hole 27 a bolt 30 screwed into said one end of the crankshaft 10 so that a large-diameter head portion 30a engages with the stepped portion 29 the disk portion 23*a*, that is, the end wall member 23, is coaxially fixed to the end of the crankshaft 10.

The end of the cylindrical member 24 on the side opposite to the support 7 is provided integrally with a collar 24*a* extending radially inwardly, and the ring portion 23*b* of the end wall member 23 is press-fitted within the cylindrical member 24 so that the collar 24*a* abuts against one end face of the ring portion 23*b*.

Moreover, projections 31 projecting from said one end face of the ring portion 23*b* are projectingly provided at a plurality of positions in the peripheral direction of the ring portion 23*b*, the projections 31 are inserted into a plurality of engagement holes 32 provided in the collar 24*a*, and a portion of each of the projections 31 projecting from the corresponding engagement hole 32 is upset so as to engage with the collar 24*a*. This upsetting process employs a rolling upsetting method in which pressure is applied in the axial direction to the projecting portion of each of the projections 31 while carrying out precession so as to flatten the projecting portion, and such a rolling upsetting method enables the aluminum die-cast projections 31 to be fixed to the soft steel collar 24*a*, without causing cracks.

Provided projectingly at equal intervals in the peripheral direction on the other end face of the ring portion 23*b* are regulating projections 33 for determining the peripheral position of a plurality of magnets 22, the magnets 22 being inserted into the cylindrical member 24, with the relative positions therebetween being determined by the regulating projections 33, until they abut against the ring portion 23*b* and fixed to the inner periphery of the cylindrical member 24 with an adhesive, etc.

Furthermore, channels 34 extending in the axial direction are provided in sections, corresponding to the magnets 22, of the collar 24*a* of the cylindrical member 24 and an inner peripheral part of the ring portion 23*b* of the end wall member 23, and by pressing each magnet 22 with a rod-shaped test piece (not illustrated) inserted into the channel 34 it is possible to confirm whether or not the magnet 22 is reliably fixed to the inner periphery of the cylindrical member 24.

The operation of this embodiment is now explained. Since the plurality of vanes 23*b* are provided integrally with the closed end of the bottomed cylindrical rotor yoke 21 with the intake holes 25 disposed therebetween, compared with an arrangement in which a cooling fan is installed, it is possible to reduce the number of components and improve the assembly efficiency. Moreover, since it is unnecessary to ensure that there is a space, other than the rotor 9, exclusively used for generating cooling air, it is unnecessary to set the length of the crankshaft 10 at a relatively large value; it is therefore possible to prevent the rigidity with which the rotor 9 is supported from deteriorating, and to set the overall axial length of the generator at a small value. Furthermore, the weight and balance of the rotor 9, which exhibits a flywheel function, can be optimized by means of the intake holes 25 and, furthermore, cooling air flowing through the stator 8 can be generated reliably by means of the vanes 23*c* accompanying rotation of the rotor 9, thus avoiding a reduction in efficiency.

Furthermore, the rotor yoke 21 is formed from the end wall member 23 die-cast molded so as to integrally have the disk portion 23*a* having the central part thereof fixed to the end of the crankshaft 10, the ring portion 23*b* coaxially surrounding the disk portion 23*a*, and the plurality of vanes 23*c* providing a connection between the disk portion 23*a* and the ring portion 23*b*, and the cylindrical member 24 that is formed in a cylindrical shape coaxially covering the stator 8 and has one end thereof fixed to the ring portion 23*b*, and it is thus possible to form the plurality of vanes 23*c* more precisely by die-cast molding of the end wall member.

Although an embodiment of the present invention is explained above, the present invention is not limited to the embodiment and can be modified in a variety of ways without departing from the scope and spirit of the present invention described in the claims.

The invention claimed is:

1. An outer rotor type multi-pole generator comprising a stator mounted on a stationary support, and a rotor formed by fixedly attaching a magnet to the inner periphery of a bottomed cylindrical rotor yoke that is coaxially fixed to an end of a drive shaft rotatably supported by the stationary support and that coaxially covers the stator, cooling air being made to flow within a stationary casing covering the stator and the rotor, wherein a plurality of radially extending vanes are integrally provided in a closed end of the rotor yoke, and a plurality of intake holes positioned between the vanes are formed in the closed end of the rotor yoke, and wherein the rotor yoke comprises an end wall member and a cylindrical member, the cylindrical member being made of steel and the end wall member being made of an aluminum alloy so as to integrally have a disk portion having a central part thereof fixed to the end of the drive shaft, a ring portion coaxially surrounding the disk portion, and the plurality of vanes providing a connection between the disk portion and the ring portion, and the cylindrical member being formed in a cylindrical shape coaxially covering the stator and having one end thereof fixed to the ring portion, wherein projections are provided on an end face of the ring portion, the projections being inserted into engagement holes provided in a collar portion of the cylindrical member, and a portion of each of the projections projecting from the corresponding engagement hole being upset so as to engage with the collar.

2. The outer rotor type multi-pole generator according to claim 1, wherein regulating projections are provided at equal intervals in a peripheral direction on an end face of the ring portion to determine the position of a plurality of magnets.

3. The outer rotor type multi-pole generator according to claim 1, wherein the end wall member is made of a light die-cast molded aluminum alloy.

* * * * *

UNITED STATES PATENT AND TRADEMARK OFFICE
CERTIFICATE OF CORRECTION

PATENT NO. : 7,342,333 B2
APPLICATION NO. : 10/528115
DATED : March 11, 2008
INVENTOR(S) : Umezu It is certified that error appears in the above-identified patent and that said Letters Patent is hereby corrected as shown below:

Title Page -

In (54) Title, please correct to read as follows:

-- (54)    OUTER ROTOR TYPE MULTI-POLE GENERATOR --.

Signed and Sealed this

Nineteenth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,342,333 B2  Page 1 of 1
APPLICATION NO. : 10/528115
DATED : March 11, 2008
INVENTOR(S) : Umezu It is certified that error appears in the above-identified patent and that said Letters Patent is hereby corrected as shown below:

Title Page -

In (54) and Column 1, lines 1 and 2, Title, please correct to read as follows:

-- (54)   OUTER ROTOR TYPE MULTI-POLE GENERATOR --.

This certificate supersedes the Certificate of Correction issued August 19, 2008.

Signed and Sealed this

Twenty-third Day of September, 2008

JON W. DUDAS
*Director of the United States Patent and Trademark Office*